A. J. MOTTLAU.
AUTOMATIC CAMERA.
APPLICATION FILED NOV. 15, 1916.

1,241,650.

Patented Oct. 2, 1917.
2 SHEETS—SHEET 1.

Inventor:
A. J. Mottlau.
By his Atty.
John O. Seifert

A. J. MOTTLAU.
AUTOMATIC CAMERA.
APPLICATION FILED NOV. 15, 1916.

1,241,650.

Patented Oct. 2, 1917.
2 SHEETS—SHEET 2.

Inventor:
A. J. Mottlau,
By his Atty. John O. Seifert

UNITED STATES PATENT OFFICE.

AUGUST J. MOTTLAU, OF PHILADELPHIA, PENNSYLVANIA, ASSIGNOR, BY DIRECT AND MESNE ASSIGNMENTS, TO G. E. M. ENGINEERING COMPANY, OF PHILADELPHIA, PENNSYLVANIA, A CORPORATION OF DELAWARE.

AUTOMATIC CAMERA.

1,241,650.  Specification of Letters Patent.  Patented Oct. 2, 1917.

Original application filed April 28, 1916, Serial No. 94,280. Divided and this application filed November 15, 1916. Serial No. 131,364.

*To all whom it may concern:*

Be it known that I, AUGUST J. MOTTLAU, a subject of the King of Denmark, and a resident of Philadelphia, in the county of Philadelphia and State of Pennsylvania, have invented certain new and useful Improvements in Automatic Cameras, of which the following is a specification.

This invention relates to cameras and particularly to automatically operated cameras, and it is the object of the invention to provide a camera to take pictures of successive portions of an object or landscape by the camera from a moving vehicle or carrier for the camera, such, for instance, as an aeroplane, and to provide a camera which is simple and cheap in construction and efficient in operation.

With this object in view I provide a casing in which the mechanism is inclosed having an aperture or opening for a lens, with a support for a roll of web film and a take-up roll for said film intermittently rotated by a continuously rotated spring-actuated shaft to intermittently feed the film across the lens, and provide an apertured curtain intermittently moved across the film by means operable from the continuously rotating shaft, the movement of the curtain being so timed with relation to the movement of the film that it will intercept the light rays through the lens during the periods of movement of the film and expose a portion of the film through an aperture in the curtain during the periods of rest of the film.

The present application is a division of my co-pending application, filed April 28, 1916, Serial No. 94280, and relates particularly to shutter mechanism to intercept the light rays during the periods of movement of the film and expose the film during the periods of rest of the film.

In the drawing accompanying and forming a part of this specification, Figure 1 is a sectional side elevation of a camera showing an embodiment of my invention, the section being taken on the line A—A of Fig. 3 looking in the direction of the arrows.

Similar characters of reference designate like parts throughout the different views of the drawings.

Figure 1:
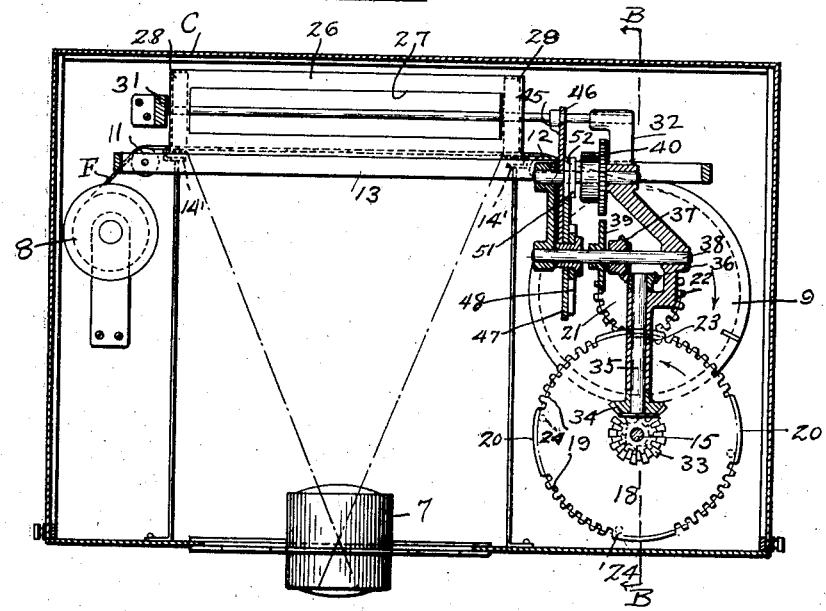
Figure 2:
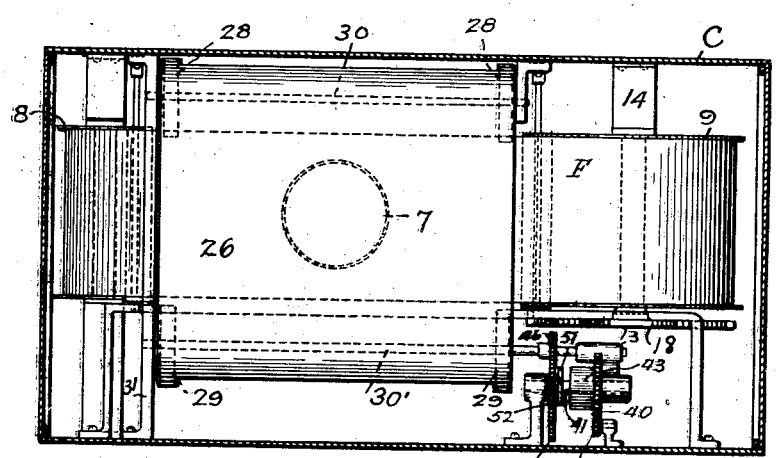
Fig. 2 is a plan view with the top of the casing removed to show the interior mechanism.

The embodiment of the invention as shown in the drawings consists of a casing C to inclose and carry the mechanism, said casing having a removable part as usual whereby access may be had to the mechanism or for the purpose of supplying or removing a film, and has in one wall an opening for the mounting of a lens 7. A removable spool 8 for a roll of web film F is rotatably supported in the casing. The film is adapted to pass across the lens and is connected at the free end to a removable take-up roll 9 in the casing adjacent the side opposite to the spool of rolled film, and rotatably supported upon a stud 10 and a resilient or spring arm 14. The film in its travel to the take-up roll is guided over a pair of rollers 11, 12 rotatably supported in a bracket 13 and over a pair of guide bars 14′, the said guide bars being substantially of channel shape in cross section for a purpose to be hereinafter described.

The film is intermittently fed across the lens from a rotatable shaft 15 continuously driven by a spring 16, one end of which spring is connected to the shaft and the other end to a fixed part as usual, the said spring being wound by a crank 17 fixed to the shaft exterior of the casing. To intermittently rotate the take-up roll from the shaft there is fixed on the shaft a mutilated gear 18, the said gear having four segmental toothed portions 19 with a blank space 20 between said toothed portions. The gear coöperates with a mutilated pinion 21, said pinion having opposed toothed sections 22 with diametrically opposite blank sections 23 between the toothed sections. The gear 18 is rotated in the direction of the arrow (Fig.

1) by the spring and during each one-quarter revolution of the gear, or as a toothed segment thereof is in mesh with a toothed portion of the pinion, the pinion will have a one-half revolution imparted thereto. As the blank portion 20 of the gear comes opposite the pinion no motion will be imparted to the pinion; but just previous to the next toothed section of the gear coming in contact with the pinion one of a series of four pins 24 projecting laterally from one face of the gear will engage with one of a pair of dogs 25 fixed to and projecting beyond the periphery of the pinion thereby moving the pinion so that a toothed section thereof will mesh with a toothed portion of the gear when a further one-half revolution will be imparted to the pinion and such movement transmitted through the shaft 15 to the take-up roll 9.

To intercept the light rays through the lens during the movement of the film and to expose a portion of the film during the periods of rest, the shutter mechanism is provided, consisting of an endless apertured curtain 26, the curtain in the present instance having two apertures 27 and supported adjacent its lateral ends upon rollers 28, 28 and 29, 29 fixed to shafts 30, 30' journaled at one end in a bracket 31 and at the opposite end in an extension of a bracket 32. The curtain is movable intermittently transversely of and intersects the path of movement of the film, the film passing between the curtain, and during this movement is guided in the channel portion of the bars 10, as clearly shown in Fig. 1, these channel bars also serving to separate the curtain from the film.

This intermittent movement is imparted to the curtain by the shaft 15 through a beveled pinion 33 rotatable with said shaft, and which may be constructed integral with the gear 18, meshing with a beveled pinion 34 fixed to a vertical shaft 35 journaled in the bracket 32 and having at the end opposite to the pinion 34 a beveled pinion 36 meshing with a beveled pinion 37 fixed to a shaft 38. Fixed to the shaft 38 is a pinion 39 driving a second pinion 40 loose on a shaft 41 in the same direction as the first pinion 39 through an intermediate pinion 42.

Figure 3:
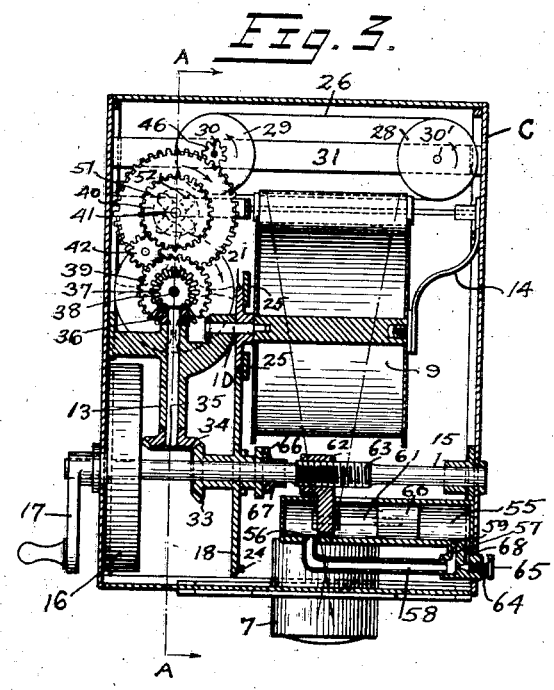
Fig. 3 is a cross sectional view taken on the line B—B of Fig. 1 looking in the direction of the arrows.
Figure 4:
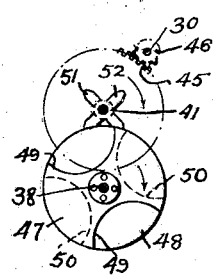
Fig. 4 is a detail view of the means to control the movement of the curtain, said view being taken on the line and looking in the direction of the arrows C—C of Fig. 5.
Figure 5:
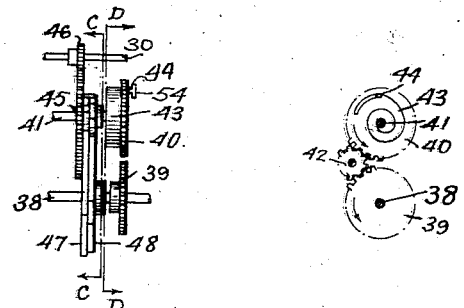
Fig. 5 is a detail view of the means to intermittently move the curtain.
Figure 6:
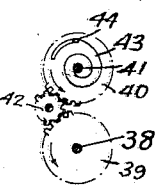
Fig. 6 is a detail side elevation taken on the line and looking in the direction of the arrows D—D of Fig. 5.

Motion is imparted from the pinion 40 intermittently to the shaft 41 through a spring 43 coiled about the shaft and connected to one end of the shaft and at the other end to a pin 44 projecting laterally from the pinion, and such movement of the shaft 41 is transmitted to the curtain through a gear 45 fixed to the shaft 41 meshing with a pinion 46 fixed to the shaft 30 of the curtain carrying wheels 29. The pinion 41 is rotated in the direction indicated by the arrows in Figs. 3 and 6, and as said pinion is rotated it will wind the spring 43 around the shaft and the tension of the spring will rotate the connected shaft and the gear 45 fixed thereon in the same direction as the pinion 40, as indicated by the arrows in Figs. 3 and 4 and the curtain carrying wheels 28, 29 in the direction of the arrows through the pinion 46. The shaft 41 is held against movement and is successively released to permit movement to be imparted thereto through the pinion 40 to the spring 43 by escapement mechanism consisting of a pair of juxtaposed disks 47, 48, fixed to the shaft 38, the disk 47 having diametrically opposite circular recessed portions 49, 49 and the disk 48 having similar recesses 50, 50, said latter recesses being located at right angles to the recesses 49 in the disk 47, as clearly shown in Fig. 4. Fixed to the shaft in juxtaposed relation to each other and the gear 45 are dogs 51, 52 extending laterally from the shaft diametrically opposite to each other and the dogs 51 being substantially at right angles to the dogs 52. The disks 47 and 48 are rotated in the direction of the arrow (Fig. 4) with the pinion 39, and the dogs 51, 52 and gear 41 are urged in the direction of the arrow by the spring 43. However, rotation of the gear 45 is prevented by a dog 51 engaging with an unrecessed portion of the periphery of the disk 48 until said dog reaches a recess in the disk when the spring 43 will urge said disk and the connected gear in the direction of the arrow and thereby impart movement to the curtain and until a dog 52 engages with an unrecessed portion of the disk 47. During such engagement of a dog 52 with the disk 47 the spring 43 will again be wound or tensioned until a recessed portion of the disk 47 reaches said dog 52 when the dog with the connected gear 45 will again be advanced by the spring 43. The mechanism is so timed that when the film is being moved the curtain or shutter remains stationary, intercepting the light rays through the lens to the film, the apertured portions of the curtain during this time being at opposite ends, and when the film is stationary the curtain will be moved to expose the film through an aperture 27 in the curtain. To increase or decrease the tension of the spring 43 the pin 44 is adjustably connected to the pinion 40, for which purpose the pin 44 to which one end of the spring is connected has a screw threaded shouldered end to engage in a slot 53 in the pinion 44 and clamped in adjusted position in said slot by a thumb-nut 54.

The movement of the mechanism is regulated through the shaft 15, and for this purpose there is provided a dash-pot consisting of a cylinder 55 for a suitable fluid or liquid, the bore of the cylinder 55 extending parallel with the shaft 15. The cylinder has ports 56, 57 adjacent opposite ends connected by a tube 58 and the port 57 closed by a valve 59 closing outward from and opening into the cylinder to normally shut off communication between opposite ends of the cylinder through the ports 56, 57. A plunger or piston 60 is adapted to reciprocate in the cylinder, said piston being connected by a rod 61 to an arm 62 extending through a slot in the cylinder and said arm having screw threaded connection with the shaft 15, as shown at 63. The end of the cylinder in front of the piston is also connected to the opposite end through the tube 58 and port 56 through an outlet or port 62 connected to the tube 58, the opening and closing as well as the area of the port being controlled by a needle valve 64 operable by a knurled finger piece 65 exterior of the casing. As the operating spring 16 is wound the arm 62 with the piston 60 will be moved to the left as viewed from Fig. 3, this movement of the piston unseating the valve 59 and drawing the liquid from in back to the front of the piston. During the winding of the spring no movement will be imparted to the film feeding and shutter actuating mechanism as said mechanism will be uncoupled from the shaft 15 by a pawl 66 carried by the gear 18 riding over a ratchet-wheel 67. After the spring 16 has been wound and the mechanism is being actuated by the spring the shutter actuating and film feeding mechanism will be connected to the shaft through the pawl and ratchet 66, 67 and the movement of the shaft will cause the piston 60 to move into the cylinder, this movement of the piston seating the valve 59 and permitting the escape of the fluid in front of the piston only through the restricted outlet 68, thereby retarding the movement of the piston and thereby the rotation of the shaft 15 as well as the connected shutter actuating and film-feeding mechanism. It will be obvious that this movement is regulated in accordance with the restricting or enlarging of the outlet 62 by the needle valve 64. The operation of the camera may be stopped at will by screwing the valve 64 to its seat to prevent the escape of fluid from in front of the piston. It will be noted that the arm 62 instead of passing through a slot in the cylinder to connect it to the piston 60, may be so connected to the piston whereby the cylinder will be entirely closed, but for the purpose for which the present camera is designed, that is, for taking pictures of landscapes from an aeroplane, the construction as illustrated will suffice, since in such use the portion of the camera in which the lens is located will be at the bottom.

Having thus described my invention, I claim:

1. In a camera the combination with a lens and a web film intermittently movable across said lens, of an endless apertured curtain movable transversely of the film to intersect the path of movement of the film and successively expose portions transversely thereof, and said film passing between said curtain, and means to actuate the curtain alternately with the movement of the film, substantially as and for the purpose specified.

2. In a camera the combination of driving means; a lens; a web film; means operable from the driving mechanism to intermittently move the film across the lens; an apertured curtain intersecting the film in front thereof; means operable from said driving means to move the curtain alternately with the movement of the film; and escapement mechanism to control the movement of the curtain, substantially as and for the purpose specified.

3. In a camera the combination with a lens, of a continuously rotating shaft; a web film operable from the shaft to intermittently move the film across the lens; an apertured curtain intersecting the film in front thereof; and means operable from the shaft to intermittently move the curtain alternately with the movement of the film, substantially as and for the purpose specified.

4. In a camera the combination of a lens; a web film; a rotatable shaft; a spring to continuously rotate said shaft; means operable from said shaft to intermittently feed the film across the lens; an endless apertured curtain movable across the path of movement of the film; rotatable wheels to support said curtain; and means to intermittently move said curtain to intercept the light rays through the lens to a portion of the film during the movement of the film and to expose a portion of the film through an aperture in the curtain during the periods of rest of the film.

5. In a camera the combination of a lens; a web film; a rotatable shaft; a spring to continuously rotate said shaft; means operable from said shaft to intermittently feed the film across the lens; an endless apertured curtain movable across the path of movement of the film; rotatable wheels to support said curtain; a pinion rotatable with said shaft; a second pinion driven through an intermediate pinion from and in the same direction as the first pinion; a gear fixed on the shaft of the second pinion; a pinion rotatable with one of the curtain wheels meshing with said gear; and escapement mechanism controlled by the first and second pinions to intermittently operate the gear and thereby the curtain to cause the curtain to intercept the light rays to a portion of the film through the lens during the movement of the film and expose a portion of the film during the periods of rest thereof.

6. In a camera the combination of a lens; a continuously rotating shaft; a web film; means operable from the shaft to intermittently move the film across the lens; an apertured curtain intersecting the film in front thereof; means to move the curtain alternately with the movement of the film; and escapement mechanism to control the movement of the curtain, substantially as and for the purpose specified.

7. In a camera the combination of a lens; a continuously rotating shaft; a web film operable from the shaft to intermittently move the film across the lens; an endless apertured curtain intersecting the film with the film engaging between said curtain; means operable from the shaft to impart movement to the curtain; and means actuated by the shaft to control the movement of the curtain to intermittently move the curtain alternately with the movement of the film, substantially as and for the purpose specified.

8. In a camera the combination with a lens and a web film, of a rotatable shaft; means actuated by said shaft to move the film across the lens; an endless apertured curtain extending in front of the film to intercept the light rays through the lens; and means actuated by the shaft to move said curtain transversely of the film to expose portions of the film through an aperture in the curtain, substantially as and for the purpose specified.

9. In a camera the combination with a lens and a web film, of a rotatable shaft; means actuated by said shaft to move the film across the lens; an endless apertured curtain between which the film extends so that the curtain intercepts the film; and means actuated by the shaft to intermittently move the curtain transversely of the film to successively expose portions of the film, substantially as and for the purpose specified.

10. In a camera the combination of a lens; a web film; a rotatable shaft; a spring to continuously rotate said shaft; means operable from said shaft to intermittently feed the film across the lens; an endless apertured curtain movable across the path of movement of the film; rotatable wheels to support said curtain; and means to intermittently move said curtain to cause said curtain to intercept the light rays through the lens to a portion of the film during the movement of the film and to expose a portion of the film through an aperture in the curtain during the periods of rest of the film, comprising a pinion continuously rotated from the shaft, a second pinion rotatable from and in the same direction as the first pinion, a gear fixed on the shaft of the second pinion, a pinion rotatable with one of the curtain wheels meshing with said gear, and escapement mechanism controlled by the two pinions to intermittently operate the gear and thereby the curtain.

11. In a camera the combination of a lens; a web film; a rotatable shaft; a spring to continuously rotate said shaft; means operable from said shaft to intermittently feed the film across the lens; an endless apertured curtain movable across the path of movement of the film; rotatable wheels to support said curtain; a pinion rotatable from the shaft; a second pinion driven through an intermediate pinion from and in the same direction as the first pinion; a gear fixed on the shaft of the second pinion; a pinion rotatable with one of the curtain wheels meshing with said gear; and escapement mechanism controlled by the first and second pinions to intermittently operate the gear and thereby the curtain to cause the curtain to intercept the light rays to a portion of the film through the lens during the movement of the film and expose a portion of the film during the periods of rest thereof, comprising a pair of juxtaposed disks each disk having opposite recesses in the periphery, and a pair of dogs rotated by the second pinion to coöperate with said disks, substantially as and for the purpose specified.

12. In a camera the combination of a lens; a web film; a rotatable shaft; a spring to continuously rotate said shaft; means operable from said shaft to intermittently feed the film across the path of movement of the film; an endless apertured curtain movable across the path of movement of the film; a pair of rotatable rollers to support said curtain; a pinion rotatable from the shaft; a rotatable shaft; a second pinion loose on said shaft driven through an intermediate pinion from and in the same direction as the first pinion; a coiled spring connected at one end to the pinion and at the other end to the shaft, said spring being wound by the pinion during the rotation thereof and transmitting motion to the shaft in the same direction as the pinion; a gear fixed to said shaft; a pinion connected to the curtain supporting wheels meshing with said gear; and escapement mechanism to permit said spring to impart said movement to the shaft and gear to intermittently move the curtain to intercept the light rays through the lens during the movement of the film, and expose a portion of the film through an aperture in the curtain during the periods of rest of the film, comprising a pair of juxtaposed disks each disk having diametrically opposite circular recesses in the periphery, and a pair of dogs fixed to the gear to coöperate with said disks, substantially as and for the purpose specified.

13. In a camera, the combination with a lens and means to intermittently feed a film across said lens, of an apertured curtain to engage in front of the film intermittently movable transversely of the film to intercept the light rays by an unapertured portion thereof through the lens during the movement of the film and expose portions of the film successively through an aperture therein during the periods of rest of the film.

14. In a camera, the combination with a lens and a web film intermittently fed across said lens, of an apertured curtain interposed between the lens and film movable transversely of the film; and means to intermittently move said curtain to cause an unapertured portion thereof to intercept the light rays through the lens during the movement of the film and expose successive portions of the film through an aperture in said curtain during the periods of rest of the film.

Signed at Philadelphia, in the county of Philadelphia and State of Pennsylvania, this 31st day of October, 1916.

AUGUST J. MOTTLAU.